(12) United States Patent
Dyson et al.

(10) Patent No.: US 8,898,858 B2
(45) Date of Patent: Dec. 2, 2014

(54) CLEANER-HEAD FOR A VACUUM CLEANER

(71) Applicant: Dyson Technology Limited, Wiltshire (GB)

(72) Inventors: James Dyson, Malmesbury (GB); Christopher Lesniowski, Malmesbury (GB); Stephen Benjamin Courtney, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 119 days.

(21) Appl. No.: 13/761,966

(22) Filed: Feb. 7, 2013

(65) Prior Publication Data
US 2013/0205539 A1     Aug. 15, 2013

(30) Foreign Application Priority Data

Feb. 8, 2012   (GB) .................................. 1202177.0

(51) Int. Cl.
*A47L 9/04* (2006.01)
*H02K 7/14* (2006.01)
*A47L 9/28* (2006.01)

(52) U.S. Cl.
CPC ............... *A47L 9/0411* (2013.01); *H02K 7/14* (2013.01); *A47L 9/0455* (2013.01); *A47L 9/0477* (2013.01); *A47L 9/2889* (2013.01); *A47L 9/0438* (2013.01)
USPC .................... 15/375; 15/376; 15/377; 15/383; 15/413

(58) Field of Classification Search
CPC ............... A47L 5/30; A47L 5/34; A47L 5/32; A47L 9/0416; A47L 9/0455; A47L 9/0477; A47L 9/0411

USPC ......... 15/375–377, 389–392, 383, 413, 415.1
See application file for complete search history.

(56) References Cited

U.S. PATENT DOCUMENTS

| 1,638,797 | A | 8/1927 | Claus |
| 1,914,834 | A | 6/1933 | Otto |

(Continued)

FOREIGN PATENT DOCUMENTS

| DE | 197 06 239 | 4/1998 |
| DE | 198 05 900 | 7/1999 |

(Continued)

OTHER PUBLICATIONS

Search Report dated May 28, 2012, directed towards GB Application No. 1202177.0; 1 page.

(Continued)

*Primary Examiner* — Dung Van Nguyen
(74) *Attorney, Agent, or Firm* — Morrison & Foerster LLP

(57) ABSTRACT

A cleaner head for a vacuum cleaner has a rotating brush bar driven by an air-cooled motor, which is mounted inside the cleaner head with at least a section of the motor being located inside the brush bar. To cool the motor in use, an external casing of the motor is provided a plurality of air-cooling holes comprising at least one air intake and at least one air exhaust. These cooling holes are connected—intake to exhaust—to form one or more air-cooling paths through the inside of the motor. Each air intake is connected to an upstream clean air inlet by a stationary—not rotating—intake duct, and each air exhaust is similarly connected to a downstream clean air outlet by a stationary—not rotating—exhaust duct. This avoids the problems associated with using the rotating brush bar itself as a duct for carrying cooling air to the motor.

14 Claims, 9 Drawing Sheets

(56) References Cited

U.S. PATENT DOCUMENTS

| | | | |
|---|---|---|---|
| 4,268,769 A * | 5/1981 | Dorner et al. | 310/67 R |
| 5,465,451 A | 11/1995 | Stegens | |
| 6,134,745 A | 10/2000 | Woerwag | |
| 6,323,570 B1 | 11/2001 | Nishimura et al. | |
| 6,400,048 B1 * | 6/2002 | Nishimura et al. | 310/47 |
| 6,848,147 B2 * | 2/2005 | Syverson et al. | 15/389 |
| 8,776,310 B2 * | 7/2014 | Genn et al. | 15/375 |
| 8,776,311 B2 * | 7/2014 | Genn et al. | 15/377 |
| 2005/0160555 A1 | 7/2005 | Mayes | |
| 2011/0303239 A1 | 12/2011 | Harrison et al. | |
| 2013/0174373 A1 | 7/2013 | Genn et al. | |
| 2013/0212832 A1 | 8/2013 | Genn et al. | |

FOREIGN PATENT DOCUMENTS

| | | |
|---|---|---|
| EP | 1 371 317 | 12/2003 |
| GB | 2478386 | 9/2011 |
| JP | 11-42184 | 2/1999 |
| JP | 2000-245662 | 9/2000 |
| JP | 2010-131456 | 6/2010 |

OTHER PUBLICATIONS

Genn et al., U.S. Office Action mailed Oct. 2, 2013, directed to U.S. Appl. No. 13/738,488; 6 pages.

Genn et al., U.S. Office Action mailed Oct. 2, 2013, directed to U.S. Appl. No. 13/761,990; 5 pages.

\* cited by examiner

CLEANER-HEAD FOR A VACUUM CLEANER

REFERENCE TO RELATED APPLICATIONS

This application claims the priority of United Kingdom Application No. 1202177.0 filed on Feb. 8, 2012, the entire contents of which are incorporated herein by reference.

FIELD OF THE INVENTION

The present invention relates to the field of vacuum cleaners, and in particular to a cleaner head for a vacuum cleaner.

The invention is concerned specifically with cleaner heads which incorporate a motor-driven agitator. The vacuum cleaner, on the other hand, may be of any general type. For example, the cleaner head may be a fixed cleaner head on an upright vacuum cleaner, or alternatively it may be the cleaner head of a floor tool used with a cylinder vacuum cleaner or stick-vac cleaner. The invention is not limited to cyclonic vacuum cleaners.

BACKGROUND OF THE INVENTION

It is conventional to provide the cleaner head of a vacuum cleaner with an agitator, such as a rotating brush bar, for agitating or "beating" a floor surface—particularly carpet—to improve pick-up performance.

Although the main vac-motor on the cleaner can be used to drive this agitator, it is more common to use a separate, dedicated motor to drive the agitator. This separate motor can then be positioned close to the agitator—usually somewhere on the cleaner head itself—to simplify the transmission arrangement.

In a particularly compact sort of arrangement, the motor is actually housed inside the agitator, which usually takes the form of a hollow cylindrical brush bar. This sort of layout is described in U.S. Pat. No. 6,323,570.

Housing the motor—or part of the motor—within the restricted space inside the agitator makes the motor prone to overheating. Typically therefore, these "motor-in-brushbar" arrangements will incorporate some sort of air-cooling scheme for drawing clean—not dirty—air through the inside of the brush bar to cool the motor.

In the schemes described in U.S. Pat. No. 6,323,570, the cooling air is pulled through the hollow brush bar, which effectively acts as a rotating clean-air duct inside the cleaner head. This arrangement requires an effective dynamic seal to be provided around the brush bar, in order to prevent the dirty air from the main suction chamber being sucked into the motor, through the brush bar.

SUMMARY OF THE INVENTION

It is an aspect of the present invention to provide an improved "motor-in-brushbar" type cleaner head, in particular by trying to improve the air-cooling scheme for the motor.

According to the present invention, there is provided a cleaner head for a vacuum cleaner, the cleaner head having a dirty-air inlet provided in a main suction chamber of the cleaner head, an outlet duct extending from the main suction chamber for connection to a suction source, and a rotating brush bar housed inside the main suction chamber for agitating a floor surface contacted through the dirty-air inlet, the brush bar being driven by an air-cooled motor, the motor being mounted inside the cleaner head with at least a section of the motor being located inside the brush bar, an external casing of the motor having a plurality of air-cooling holes consisting of at least one air intake and at least one air exhaust, the cooling holes being connected—intake to exhaust—to form one or more air-cooling paths through the inside of the motor, each air intake being connected to an upstream clean air inlet by a stationary intake duct, and each air exhaust being connected to a downstream clean air outlet by a stationary exhaust duct.

The brush bar itself is not used as an air duct for the cooling air. Rather, dedicated stationary ducts are provided to supply and exhaust the cooling air to and from the motor. Consequently, there is no requirement to provide any dynamic seal around the brush bar in order to isolate the clean air from the dirty air inside the main suction chamber, and the cooling scheme is therefore greatly simplified.

In the arrangement described in U.S. Pat. No. 6,323,570, because the brush bar functions as an air duct, upstream of the motor, a puncture in the brush bar wall introduces a risk of dirty air in the main suction chamber being sucked through the brush bar and into the motor, with possible damage to the motor. However, in the arrangement of the present invention this cannot happen, because the brush bar does not form part of the air cooling circuit for the motor: the cooling air is instead supplied and exhausted via the stationary ducts. This allows the use of a reduced wall thickness for the brush bar—reducing material costs—without any attendant risk of motor damage caused by brush bar failure.

The motor, or at least the section of the motor inside the brush bar, may be located inside a hollow end section of the brush bar, and may be cantilevered on a motor support assembly through a respective first end of the brush bar. Cantilevering the motor through one end of the brush bar—rather than supporting the motor through both ends of the brush bar—provides for a relatively simple and compact arrangement.

The stationary ducts are preferably also arranged in a simple, compact configuration. If the cooling holes are all positioned on the section of the motor inside the hollow end section of the brush bar, then a compact configuration may be achieved by arranging the stationary air ducts so that they connect respectively to the air intake(s) and the air exhaust(s) through the first end of the brush bar, rather than through opposite ends of the brush bar. Alternatively, if a section of the motor is located inside the hollow end section of the brush bar and a section of the motor extends outside the first end of the brush bar, then the air cooling holes may all be positioned on the section of the motor extending outside the first end of the brush bar, so that the stationary ducts do not need to pass through either end of the brush bar at all. This further simplifies the configuration of the stationary ducts, and helps minimise brush bar diameter. If the motor is a brushed motor, then in the latter arrangement the motor is preferably arranged so that the brushes are located outside the first end of the brush bar, in which case the cooling holes can be provided in close proximity to the relatively hot brushes, for effective cooling. In another arrangement, some of the cooling holes may be provided outside the first end of the brush bar and some may be provided inside the brush bar, the latter connecting to stationary ducts through the first end of the brush bar. This allows effective supply of air to the distal end of the motor, whilst nevertheless reducing the relative number of stationary ducts that must pass through the end of the brush bar.

The clean air inlet may be provided at the first end of the cleaner head, reducing the length of the stationary ducts.

It is preferable that the brush bar can be removed for cleaning, repair or replacement. In one arrangement, the hollow end section of the brush bar fits over the cantilevered motor and/or stationary duct(s) like a sleeve, and the brush bar is arranged to be removed from the cleaner head by sliding the brush bar out through the opposite end of the cleaner head via a side opening in the wall of the main suction chamber. Advantageously in this arrangement, the removal of the brush bar is not inhibited by the motor support assembly and/or the stationary duct(s), and so removal of the brush bar is straightforward for the user.

The side opening in the wall of the main suction chamber may be closed by a removable end cap on the cleaner head, which can be removed as and when it is required to remove the brush bar from the cleaner head. The brush bar may be supported on the end cap by a bearing, which engages the brush bar in a push-fit for easy disengagement when replacing the brush bar.

The entire brush bar may be hollow, though this is not essential provided that at least an end section of the brush bar is hollow.

The clean air outlet may be fluidly connected to the outlet duct. In one arrangement, the clean air outlet opens directly into the main suction chamber, though this is not essential. In an alternative arrangement, the clean air outlet is connected directly to the outlet duct, so that air is drawn into the neck upstream of the entrance to the outlet duct. In this arrangement, the entrance to the outlet duct acts as a fixed downstream restriction on the dirty air flow passing through the dirty-air inlet. The cross-sectional area of the outlet duct can therefore be used to tune the parallel flow rate through the clean air path, in order to ensure adequate flow rate through the clean air path even when the cleaner head is not in contact with the floor.

The brush bar may be 'indirect-drive'—being driven via some sort of transmission—or 'direct-drive'. In an indirect-drive arrangement, the transmission may be an epicyclic gearing arrangement, but this is not essential. The transmission may form part of the drive assembly supported at one end of the cleaner head, but again this is not essential—for example a gearbox could be located at the opposite end of the cleaner head from the motor, so that the motor and gearbox counterbalance one another.

The invention is not limited to any particular type of motor.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
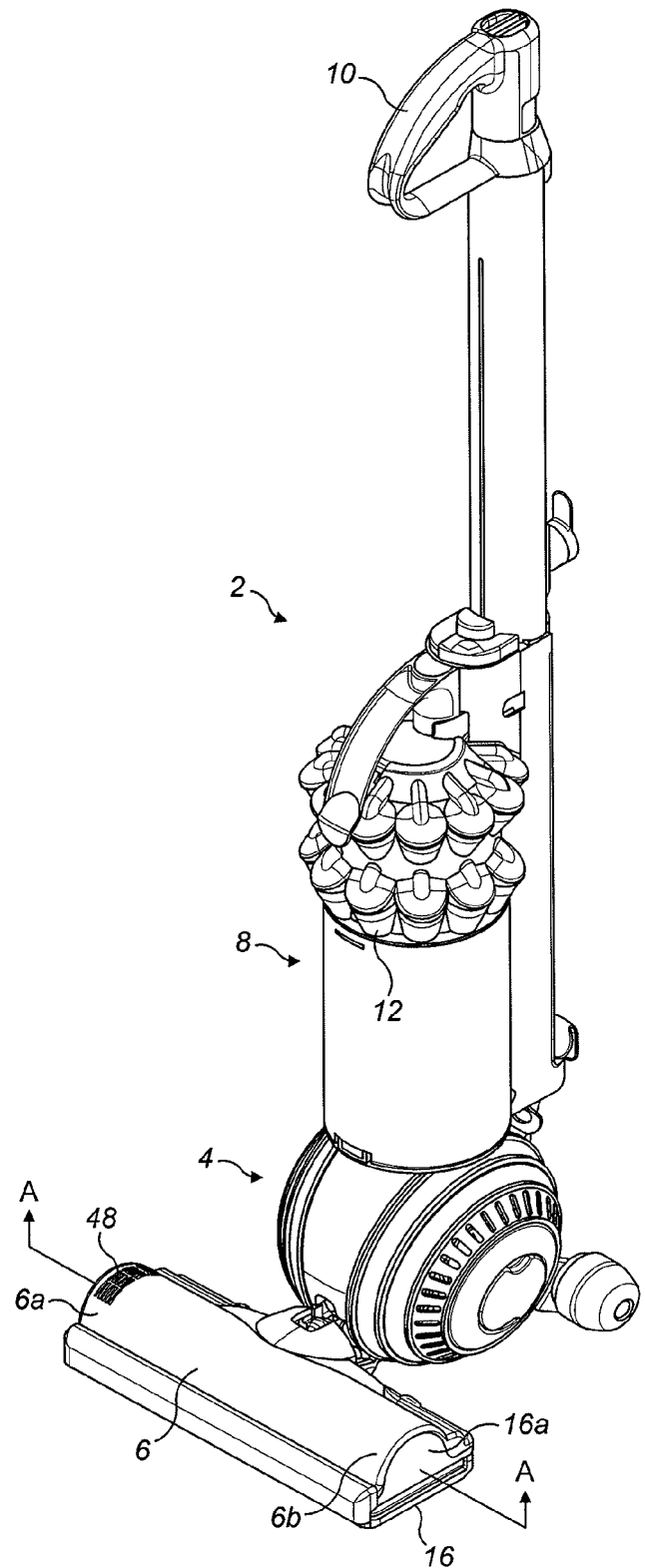
FIG. 1 is a perspective view of a vacuum cleaner having a cleaner head in accordance with the present invention.

FIG. 1 shows an upright vacuum cleaner 2. The cleaner 2 has a rolling head assembly 4 which carries a fixed cleaner head 6, and an 'upright' body 8 which can be reclined relative to the head assembly 4 and which includes a handle 10 for manouevring the cleaner 2 across the floor. In use, a user grasps the handle 10 and reclines the upright body 8 until the handle 10 is disposed at a convenient height for the user; the user can then roll the vacuum cleaner 2 across the floor using the handle 10 in order to pick up dust and other debris on the floor.

The vacuum cleaner 2 picks up the dirt and debris by entraining it in a "dirty" airflow, which is sucked in through the cleaner head 6 by a vac-motor onboard the cleaner 2.

This dirty airflow is then ducted—under the suction pressure generated by the vac-motor—to a cyclonic separating apparatus 12, where dirt is separated from the air before the relatively clean air is then exhausted back to the atmosphere.

Figure 3:
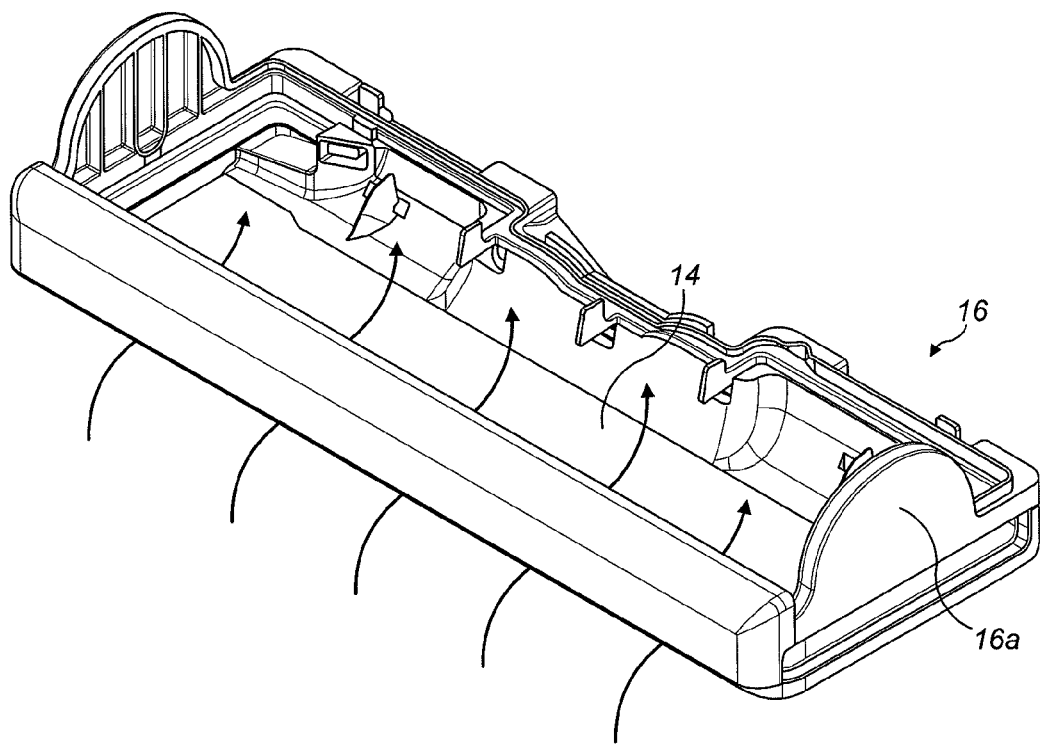
FIG. 3 is a perspective view of a removable soleplate, forming part of the cleaner head.

The dirty air enters the cleaner head 6 through a dirty air inlet. This dirty air inlet is in the form of a relatively large suction opening 14 which is provided on a removable soleplate 16, shown in FIG. 3.

Figure 4:
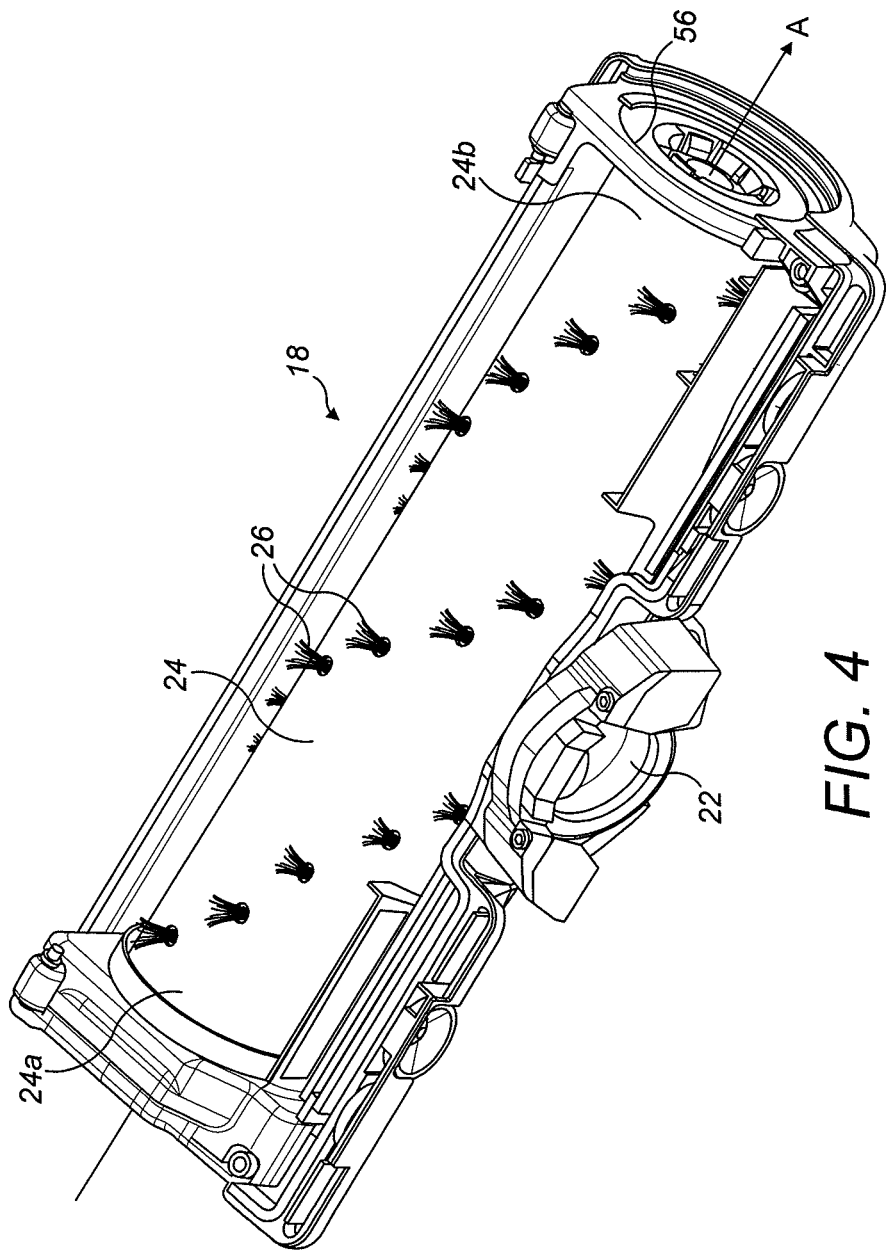
FIG. 4 is a perspective view from the underside of a brush bar housing, forming part of the cleaner head.

The soleplate 16 fits onto the bottom of a brush-bar housing 18, shown from the underside in FIG. 4, to form a main suction chamber 20 inside the cleaner head 6. An outlet duct 22 for the main suction chamber 20 (FIG. 2) is provided in the rear of the brush-bar housing 18. The dirty air passing through the suction opening 14 (the airflow is illustrated by the arrows in FIG. 3), enters the main suction chamber 20 and then exits the cleaner head 6 via the outlet duct 22, which connects to upstream ducting on the cleaner 2 for passage to the cyclonic separating apparatus 12.

An agitator in the form of a hollow, cylindrical brush bar 24 is mounted inside the main suction chamber 20, alongside the suction opening 14, for rotation about an axis A. The brush bar 24 is oriented lengthways along the axis A (FIG. 4), with a first end 24a of the brush bar 24 near a respective first end 6a of the cleaner head 6 and a second end 24b of the brush bar 24 near the respective second end 6b of the cleaner head 6.

The brush bar 24 is intended primarily to improve "pick up" on carpeted surfaces. In use, the bristles 26 on the brush bar 24 reach through the suction opening 14 in the soleplate 16 to penetrate the carpet fibres, and the agitating action of the brush bar 24 as it rotates helps dislodge stubborn dirt clinging to the carpet fibres. This dislodged dirt is more easily entrained in the airflow drawn into the cleaner head 6 through the suction opening 16.

Figure 2:
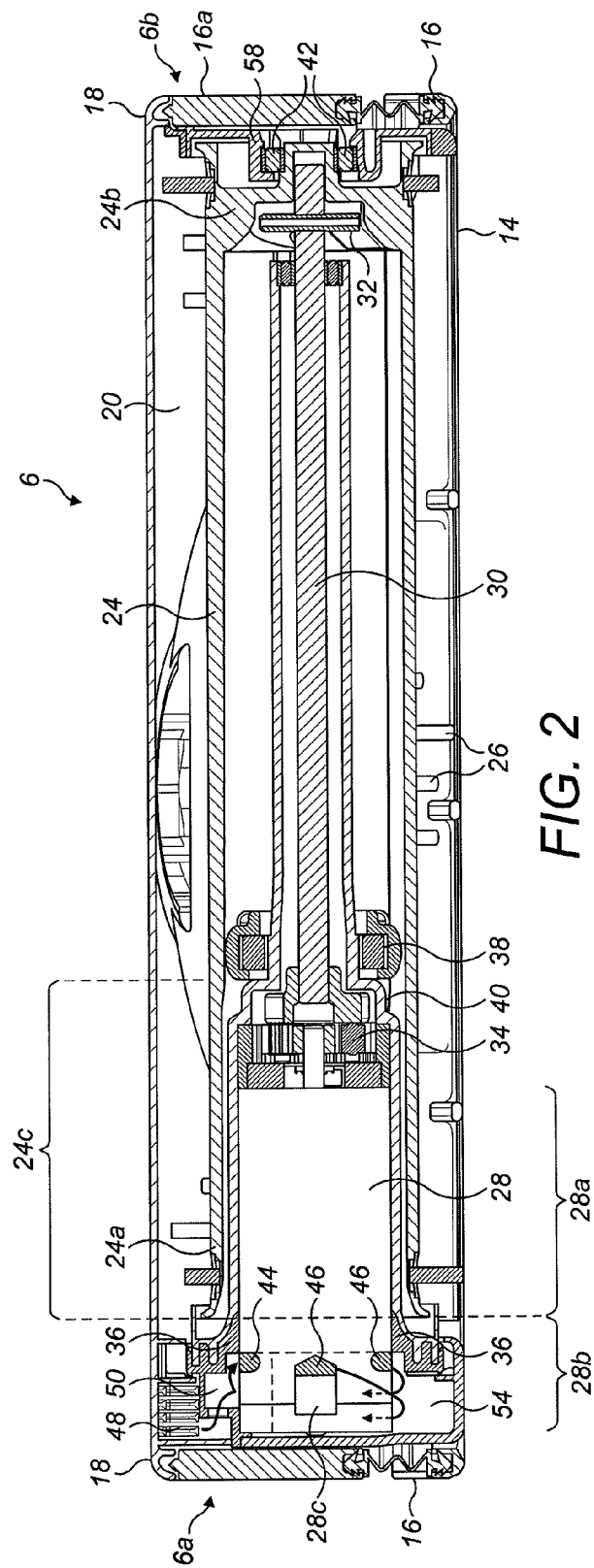
FIG. 2 is a part-sectional view of the cleaner head, taken along the line A-A in FIG. 1.

The rotating brush bar 24 is shaft-driven by a brushed motor 28, arranged co-axially with the brush bar 24 at the first end 6a of the cleaner head 6, as shown in FIG. 2. The motor torque is transmitted via an internal drive shaft 30 which extends through the hollow brush bar 24. This drive-shaft 30 engages the second end 24b of the brush bar 24 axially from the inside via a drive dog 32, which keys axially into a respective keyway (not visible in the drawings) in the end of the brush bar 24. To save space, the motor 28 itself is also housed partly inside the hollow brush bar 24: so, a first section 28a of the motor 28 is housed inside a hollow end section 24c of the brush bar 24, and a second section 28b of the motor 28—which in this case includes the carbon brushes 28c (only one of which is visible in FIG. 2)—extends out through the first end 24a of the brush bar 24. Mains (or battery) power is supplied to the motor 28 via the carbon brushes 28c, externally of the brush bar 24.

Torque transmission is via an epicyclic gearbox 34, in this case located immediately inboard of the motor 28, inside the brush bar 24.

The motor 28, gearbox 34 and drive shaft 30 are cantilevered through the first end 24a of the brush bar 24 by a motor mounting assembly 36 which is fixed at the first end 6a of the cleaner head 6.

The hollow end section 24c of the brush bar 24 is maintained in clearance around the motor 28 and the gearbox 34 via a first bearing 38. This first bearing 38 is positioned immediately in-board of the gearbox 34 on a protective housing 40 which helps prevent ingress of dust to the motor 28 and gearbox 34. A second bearing 42 supports the second end 24b of the brush bar 24.

Figure 5:
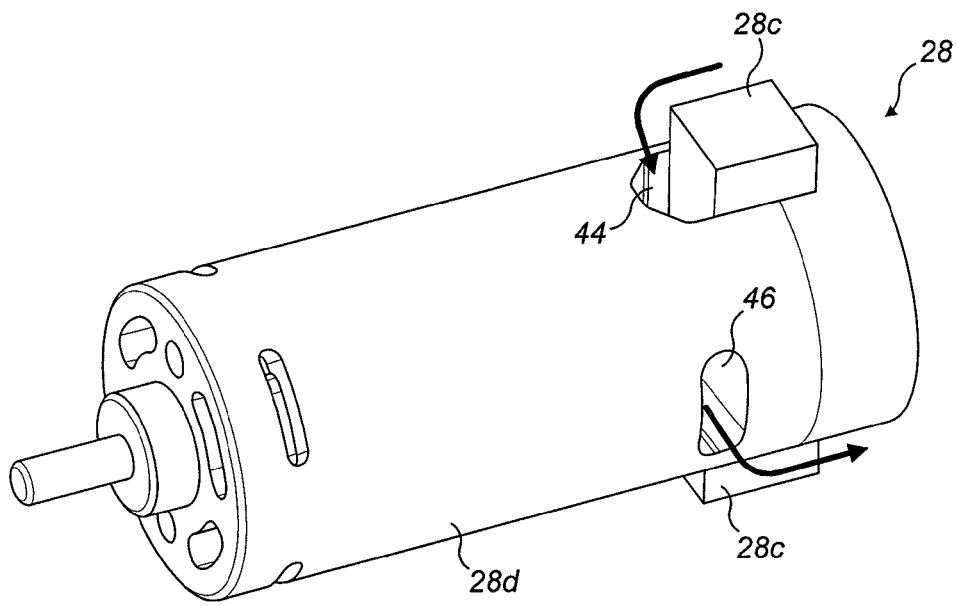
FIG. 5 is a perspective view of a motor, illustrating the position of cooling holes on the motor casing.
Figure 6:
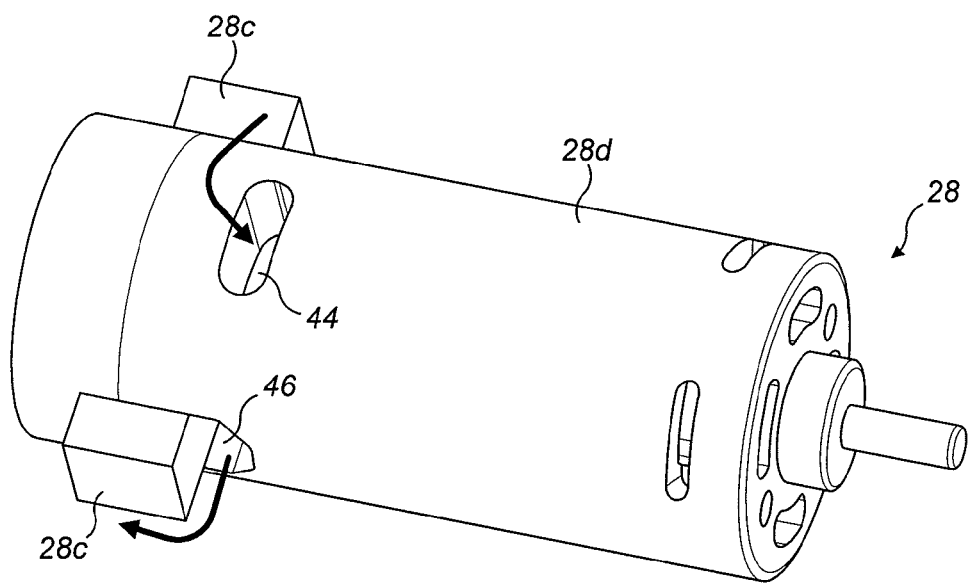
FIG. 6 is a reverse perspective view of the motor shown in FIG. 5.

The motor 28 is air-cooled in use to prevent it from overheating. Cooling holes are provided on the motor casing 28d for this purpose: in this case two air intakes 44 and two air exhausts 46 (see FIGS. 5 and 6), though more or fewer cooling holes may be provided, as required, provided that there is at least one intake and one exhaust (the motor 28 is not sectioned in FIG. 2, so that the casing 28d and cooling holes 44, 46 are visible). The cooling holes are connected—intake to exhaust—to provide an internal air-cooling path through the motor 28.

The air intakes 44 are each connected to a clean air inlet 48 provided on top of the cleaner head (see FIG. 1) by a stationary intake duct, or passageway, 50. The air exhausts 46 are each connected to a clean air outlet 52 in the wall of the outlet duct 22 by a stationary exhaust duct, or passageway 54 (see FIG. 7, which is a schematic representation of the cleaner head 6). In use, the main vac motor generates a negative pressure at the clean air outlet 52, which draws clean air in through the clean air inlet 48. This clean air is pulled in through the air intakes 44 on the motor casing 28d via the stationary intake duct 50 and is circulated through the motor 28 to the air exhausts 46, cooling the motor 28. The exhausted waste air then passes via the stationary exhaust duct 54 to the clean air outlet 52, where it passes into the outlet duct 22 and combines with the dirty air from the main suction chamber 20.

The clean air enters and exits the motor casing 28d externally of the brush bar 24. This is a simple, compact and robust arrangement, which does not have the complications associated with schemes in which a hollow brush bar is actually used as an air duct to carry cooling air to the motor.

Figure 7:
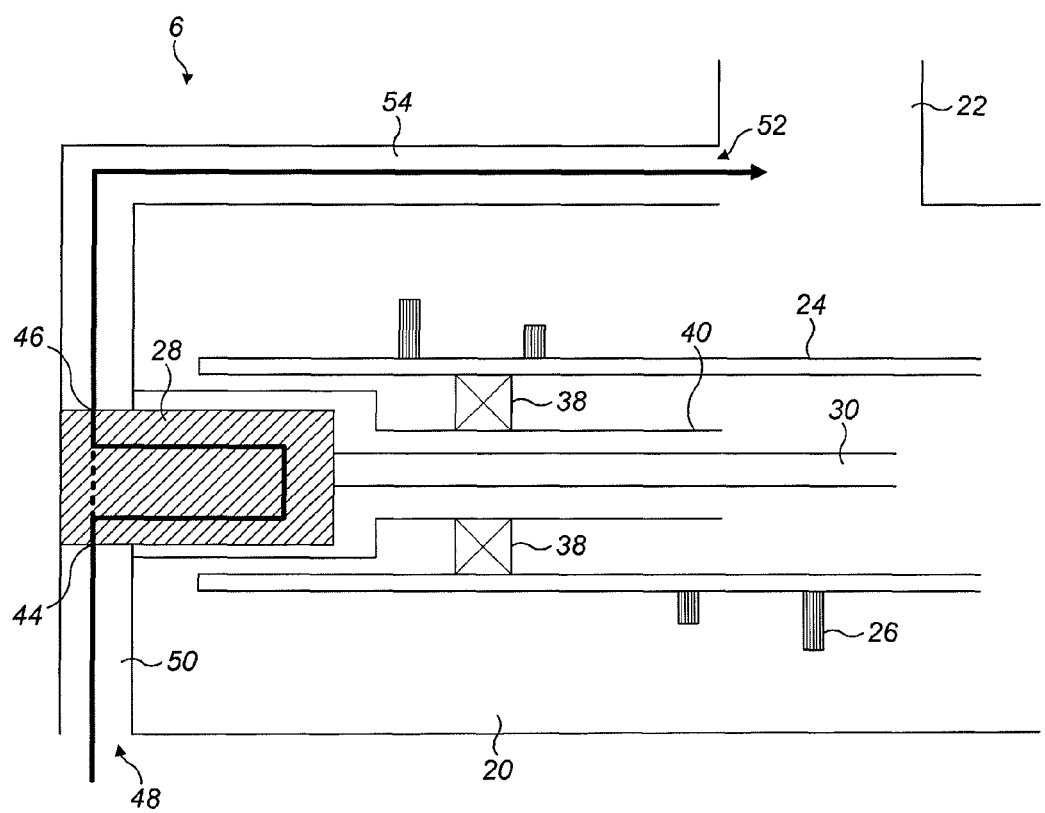
FIG. 7 is a schematic diagram illustrating part of the cleaner head.

The air cooling path inside the motor may be a circulation path which extends inside the brush bar (indicated by the bold solid arrow in FIG. 7), or it may be a "short circuit" path (indicated by the dotted line in FIG. 7). In either case, the cooling air is pulled over the carbon brushes 28c, which run relatively hot in use.

The hollow end section 24c of the brush bar 24 fits over the motor 28 and the gearbox 34 like a sleeve, and the brush bar 24 is arranged to slide out through the second end 6b of the cleaner head 6 via a side opening 56 in the main suction chamber 20. The side opening 56 is closed off by a removable end cap 58 which carries the second bearing 42. This removable end cap 58 is secured on the cleaner head 6 via a conventional bayonet fitting and secured in place by a screw.

The removable soleplate 16 incorporates an end cover 16a which fits over the end cap 58 when the soleplate 16 is in place, preventing access to the end cap 58 in use and providing a 'clean' finished appearance to the second end 6b of the cleaner head 6.

Figure 8:
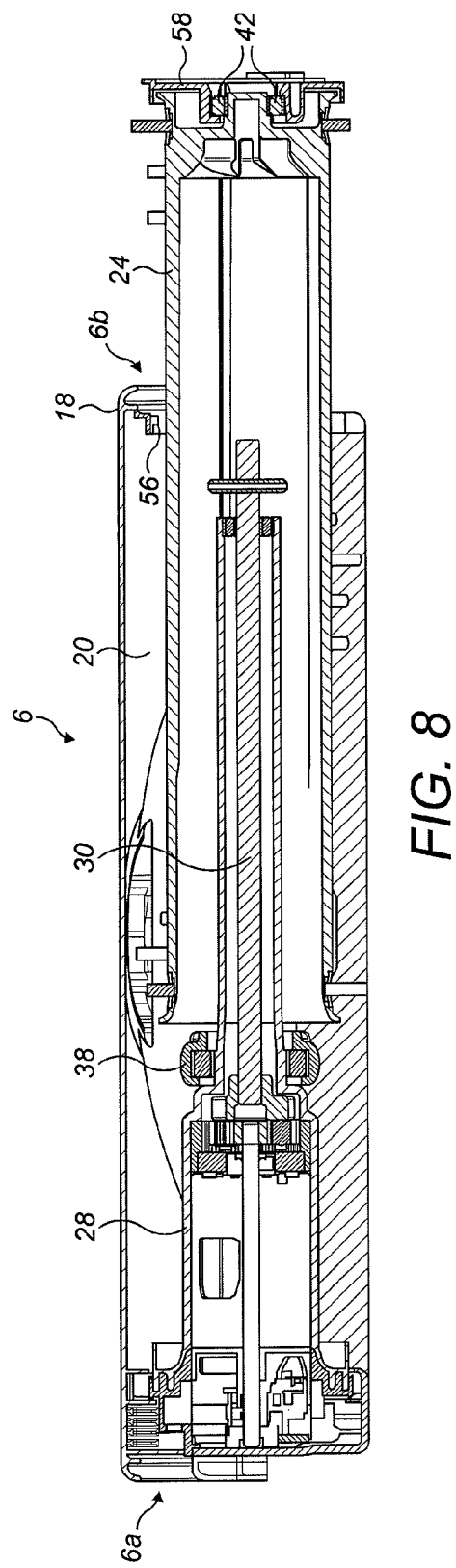
FIG. 8 is a sectional view of the cleaner head along A-A in FIG. 1, with the soleplate removed, illustrating removal of the brush bar.

To remove the brush bar 24 from the cleaner head 6 for cleaning, repair or replacement, the user removes the soleplate 16, releases the end cap 58 and slides the brush bar 24 out through the side opening 56 in the main suction chamber 20. This is illustrated in FIG. 8.

In the arrangement shown, the brush bar 24 is arranged to engage the outer race of the first bearing 38 in a frictional sliding fit so that the first bearing 38 does not inhibit removal of the brush bar 24. Alternatively, some sort of axial-splined fit may be used. In other arrangements, the radius of the bearing may be adjustable to allow unimpeded removal of the brush bar.

The inner race of the second bearing 42 engages the mating end of the brush bar 24 in a simple frictional push-fit. This allows the end cap 58 to be detached straightforwardly from the brush bar 24 as and when required, for example to attach the end cap 58 to a replacement brush bar.

Removal of the brush bar 24 through the second end 6b of the cleaner head 6 is not inhibited by the motor mounting assembly 36, which cantilevers the motor 28 through the first end 24a of the brush bar 24. Removal of the brush bar 24 through the second end 6b of the cleaner head 6 is likewise not inhibited by the stationary ducts 52, 54, which each connect to the motor 28 outside the brush bar 24.

Figure 9:
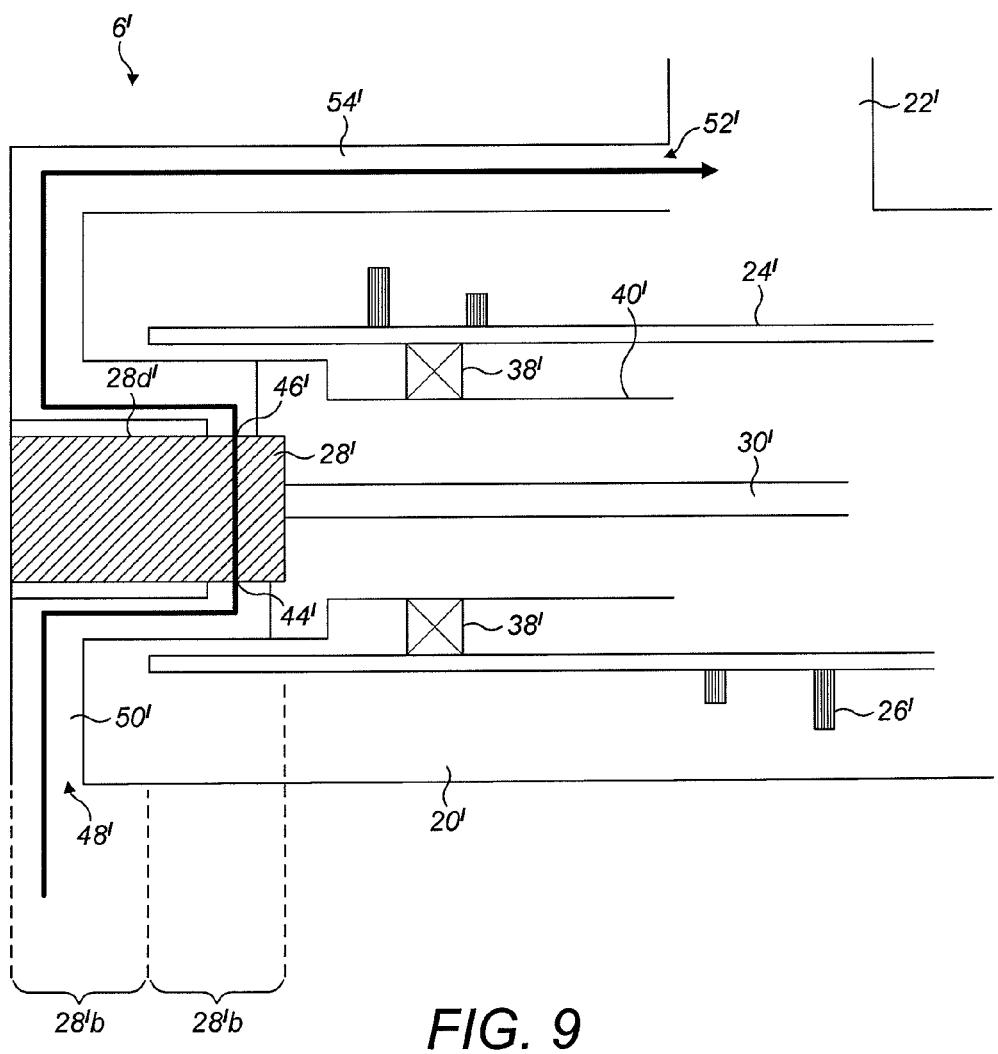
FIG. 9 is a schematic diagram illustrating part of a cleaner head having an alternative layout in accordance with the present invention.
Figure 10:
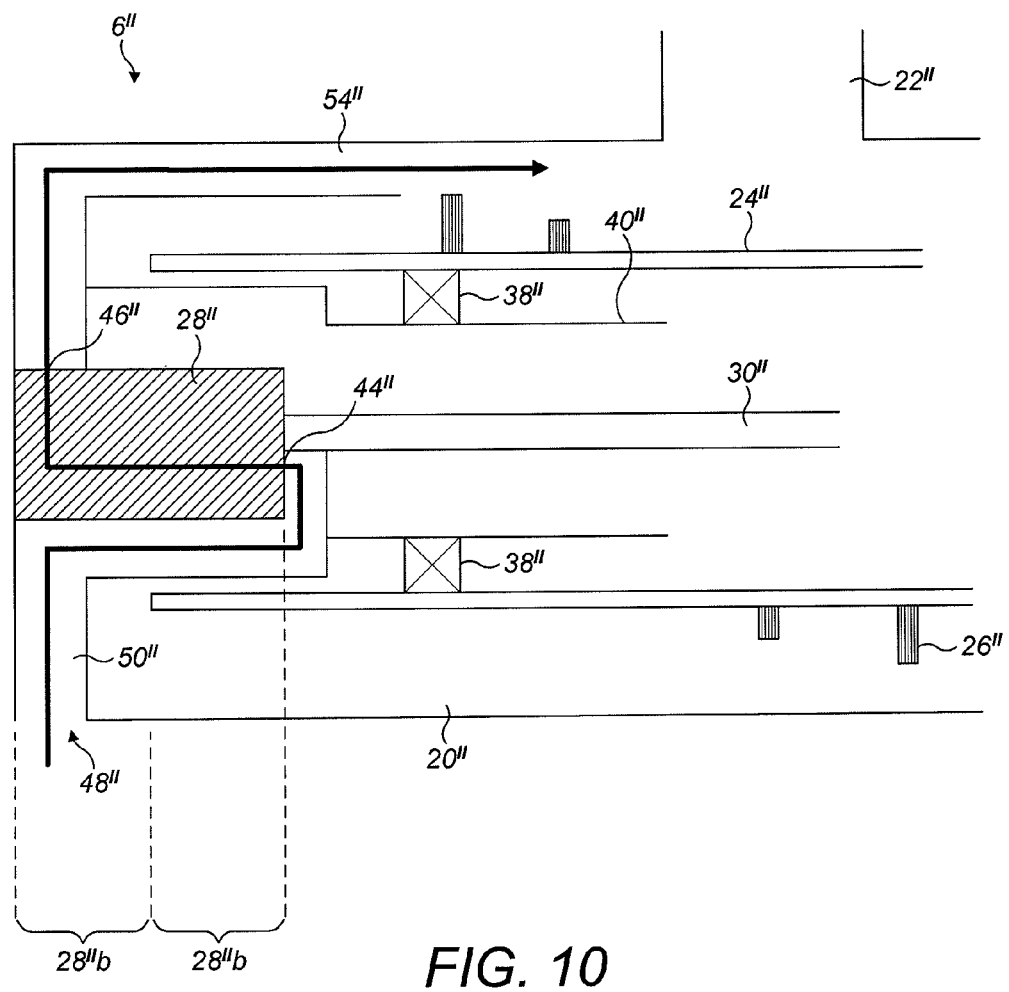
FIG. 10 is a schematic diagram illustrating part of a cleaner head having another alternative layout in accordance with the invention.

FIGS. 9 and 10 show two alternative arrangements. The arrangements are similar to the arrangement shown in FIG. 7, and corresponding features are denoted by a corresponding primed and double primed reference numeral in FIGS. 9 and 10, respectively.

The key difference in the arrangement of FIG. 9 is that the cooling holes 44, 46 are all located on the section 28a of the motor 28 which is inside the brush bar 24. Here, the stationary ducts 52, 54 connect to the respective cooling holes 44, 46 through the first end 24a of the brush bar 24.

Running the stationary ducts inside the brush bar tends to increase the brush bar diameter, but allows the cooling air to be fed in axially through the inboard end of the motor to provide an axial through-flow of cooling air through the motor. FIG. 10 illustrates this sort of arrangement. Here, although the air intake 44 is provided on the inboard end of the motor 28, inside the brush bar 24, the air exhaust 46 is actually located outside the brush bar 24: this reduces the number of stationary ducts running through the first end of the brush bar, simplifying the configuration of stationary ducts.

The arrangements shown in FIGS. 9 and 10 may also incorporate a removable brush bar which can slide out through a side opening in the main suction chamber, essentially as described above.

In FIG. 10, the clean air outlet feeds directly into the main suction chamber, rather than directly into the outlet duct. Drawing the clean air upstream of the outlet duct like this has the disadvantage that the flow resistance of the parallel dirty air path through the main suction chamber is very low, particularly if the cleaner head is lifted from the ground in use, which may result in very low flow rates along the clean air path. Nevertheless, feeding the clean air directly into the main suction chamber is a compact, simple solution which may be suitable for certain applications and motor specifications.

The invention claimed is:

1. A cleaner head for a vacuum cleaner, the cleaner head having a dirty-air inlet provided in a main suction chamber of the cleaner head, an outlet duct extending from the main suction chamber for connection to a suction source, and a rotating brush bar housed inside the main suction chamber for agitating a floor surface contacted through the dirty-air inlet, the brush bar being driven by an air-cooled motor, the motor being mounted inside the cleaner head with at least a section of the motor being located inside the brush bar, an external casing of the motor having a plurality of air-cooling holes comprising at least one air intake and at least one air exhaust, the cooling holes being connected—intake to exhaust—to form one or more air-cooling paths through the inside of the motor, each air intake being connected to an upstream clean air inlet by a stationary intake duct, and each air exhaust being connected to a downstream clean air outlet by a stationary exhaust duct.

2. The cleaner head of claim 1, in which said section of the motor is located inside a hollow end section of the motor and the motor is cantilevered on a motor support assembly, through a first end of the brush bar.

3. The cleaner head of claim 2, wherein the air cooling holes are all positioned on the section of the motor inside the hollow end section of the brush bar, and wherein the stationary air ducts connect respectively to the air intake(s) and the air exhaust(s) through the first end of the brush bar.

4. The cleaner head of claim 2, wherein a section of the motor is located inside the hollow end section of the brush bar and a section of the motor extends outside the first end of the brush bar, some of the air cooling holes being positioned on the section of the motor outside the first end of the brush bar and the remaining air cooling holes being positioned on the section of the motor which is located inside the hollow end section of the brush bar, the respective stationary ducts connecting with the cooling holes inside the brush bar through the first end of the brush bar.

5. The cleaner head of claim 2, wherein a section of the motor is located inside the hollow end section of the brush bar and a section of the motor extends outside the first end of the brush bar, the air cooling holes all being positioned on the section of the motor extending outside the first end of the brush bar.

6. The cleaner head of claim 2, wherein the clean air inlet is provided at a first end of the cleaner head, being the end nearest the first end of the brush bar.

7. The cleaner head of claim 1, wherein the clean air outlet is formed in a wall of the outlet duct.

8. The cleaner head of claim 1, wherein the clean air outlet opens directly into the main suction chamber.

9. The cleaner head of claim 2, wherein the hollow end section of the brush bar fits axially over the end of the cantilevered motor like a sleeve and the brush bar is arranged to be removed from the cleaner head by sliding the brush bar out through a second end of the cleaner head—being the end opposite said first end of the cleaner head—via a side opening in the wall of the main suction chamber.

10. The cleaner head of claim 9, wherein the side opening is closed by a removable end cap.

11. The cleaner head of claim 10, wherein the brush bar is rotatably supported by a bearing on the end cap.

12. The cleaner head of claim 11, wherein the bearing engages the brush bar in a sliding push-fit.

13. The cleaner head of claim 1, wherein the entire brush bar is hollow.

14. A vacuum cleaner having a cleaner head according to claim 1.

* * * * *